US012658967B2

(12) United States Patent
Mulder et al.

(10) Patent No.: US 12,658,967 B2
(45) Date of Patent: Jun. 16, 2026

(54) ENERGY EFFICIENT LINE-DRIVER WITH IMPROVED OUTPUT SWING

(71) Applicant: Avago Technologies International Sales Pte. Limited, Singapore (SG)

(72) Inventors: Jan Mulder, Bunnik (NL); Xiaodong Liu, Bunnik (NL); Mohammadreza Mehrpoo, Bunnik (NL); Jan Roelof Westra, Bunnik (NL)

(73) Assignee: Avago Technologies International Sales Pte. Limited, Singapore (SG)

( * ) Notice: Subject to any disclaimer, the term of this patent is extended or adjusted under 35 U.S.C. 154(b) by 398 days.

(21) Appl. No.: 18/304,998

(22) Filed: Apr. 21, 2023

(65) Prior Publication Data
US 2023/0353184 A1 Nov. 2, 2023

Related U.S. Application Data

(60) Provisional application No. 63/335,921, filed on Apr. 28, 2022.

(51) Int. Cl.
*H04B 1/40* (2015.01)
(52) U.S. Cl.
CPC ..................................... *H04B 1/40* (2013.01)
(58) Field of Classification Search
CPC .......... H04B 1/40; H04B 1/005; H04B 1/006; H04W 88/06
See application file for complete search history.

(56) References Cited

U.S. PATENT DOCUMENTS

| | | | | |
|---|---|---|---|---|
| 5,465,409 | A * | 11/1995 | Borras | H04B 1/406 |
| | | | | 455/84 |
| 5,630,213 | A * | 5/1997 | Vannatta | H04B 7/082 |
| | | | | 455/188.1 |
| 5,841,856 | A * | 11/1998 | Ide | H04M 9/082 |
| | | | | 455/553.1 |
| 9,647,742 | B2 * | 5/2017 | Black | H04B 7/0613 |
| 9,872,338 | B2 * | 1/2018 | Jechoux | H04W 88/06 |
| 10,165,513 | B1 * | 12/2018 | Gorbachov | H04B 1/40 |
| 10,389,420 | B1 * | 8/2019 | Huang | H04W 52/0206 |
| 2002/0058530 | A1 * | 5/2002 | Akama | H04N 7/147 |
| | | | | 455/553.1 |
| 2006/0132287 | A1 * | 6/2006 | Phipps | H04B 7/0802 |
| | | | | 340/10.5 |
| 2011/0003563 | A1 * | 1/2011 | Gorbachov | H01Q 21/0025 |
| | | | | 333/101 |
| 2011/0165848 | A1 * | 7/2011 | Gorbachov | H04B 1/0064 |
| | | | | 455/78 |
| 2014/0235260 | A1 * | 8/2014 | Zawaideh | H01Q 21/28 |
| | | | | 455/553.1 |
| 2016/0037359 | A1 * | 2/2016 | Black | H04B 3/46 |
| | | | | 370/241 |
| 2017/0081149 | A1 * | 3/2017 | Dugan | H04L 43/50 |
| 2023/0049925 | A1 * | 2/2023 | Lo | H03F 3/45475 |

* cited by examiner

*Primary Examiner* — Lewis G West
(74) *Attorney, Agent, or Firm* — Foley & Lardner LLP

(57) ABSTRACT
In some aspects, the disclosure is directed to methods and systems for one or more line-drivers configured to selectively operate between a plurality of modes. When operating as a voltage-mode line-driver increased power efficiency may be realized. When operating as a current-mode line-driver, an increased transmission power may be realized. When operating in a dual/additive mode, still further increased transmission power may be realized.

20 Claims, 10 Drawing Sheets

ENERGY EFFICIENT LINE-DRIVER WITH IMPROVED OUTPUT SWING

CROSS-REFERENCE TO RELATED APPLICATION

The present application claims priority to U.S. Provisional Patent Application No. 63/335,921, filed Apr. 28, 2022, the entire contents of which are incorporated by reference in their entirety.

FIELD OF THE DISCLOSURE

This disclosure generally relates to systems and methods for signal transmission. In particular, this disclosure relates to systems and methods for a high-performance low-power line-driver.

BACKGROUND OF THE DISCLOSURE

Modern semiconductor devices continue to miniaturize, which may enable increasing density and performance of these devices, but which also, increasingly, leads to the performance of devices being limited to comply with the thermal and power limits.

Communications between devices may require line-drivers capable of driving a signal onto a transmission line, which may be associated with a characteristic impedance and termination impedances. In order to comply with various signal constraints, such as noise rejection ratios, power delivered to receiving transceivers, etc., a line-driver may be configured to deliver a minimum voltage to a transmission line. In many cases, even where a lesser voltage may be adequate for the purposes of the communication, such voltages may be specified by industry standards, regulatory requirements, or other constraints.

Many such standards predate modern semiconductor nodes, and may employ specialized line-drivers, additional power supplies, or the use of current-mode line-drivers, which may operate less efficiently (e.g., require additional power, result in additional thermal load, etc.). Such implementations may negatively impact device performance.

SUMMARY OF THE DISCLOSURE

In general, communication standards can exchange information over various voltage levels. For example, the various Ethernet protocols can operate at various voltage levels or steps. More particularly, 10BASE-T employs +/−2.5V signaling, and some subsequent standards employ +/−1V signaling (e.g., according to MLT3 (1 V stepping), PAM5 (500 mV stepping), PAM 16 (133 mV stepping), or so forth). Thus, transceivers can operate across various voltage levels. Modern semiconductor devices may operate at lower voltages based on, for example, a semiconductor process node or based on an intentional power limiting such as Green Ethernet (e.g., 802.3az). A semiconductor device may, therefore, negotiate signaling protocols having a higher voltage such as in the case of communicating with a legacy device, a fall back mode, or so forth. Moreover, within a selected protocol, some voltages may exceed a threshold voltage and others may not. For example, according to the PAM 16 modulation, some signals can be conveyed at about 133 mV, whereas others can be about a volt.

According to some implementations, a current mode line driver (employing a parallel near end termination resistor) can drive high voltages onto a transmission line since no near end series termination resistance divides the voltage with the transmission line. However, such implementations may be less energy efficient than alternative line drivers (e.g., since the parallel signal paths of the near end termination and the transmission line both dissipate power). According to some implementations, a voltage mode line driver (employing a series near end termination resistor) can operate efficiently, relative to the current mode line driver. However, the voltage drop across the termination resistance may decrease a maximum voltage output.

According to the systems and methods disclosed herein, an output driver can include a first transceiver output connected to a transmission line via series termination resistors. A second transceiver output can couple to a far"tran of the series termination resistors such that the series termination resistors can form a parallel resistance between the series termination resistors (e.g., a combination thereof based on a shared node across a low-impedance output of the first transceiver output). The respective transceivers can be employed based on a voltage of a protocol or signal level thereof. Thus, for signal levels which are below a threshold, the output driver can operate as a voltage mode line driver, and for signal levels which are above a threshold, the output driver can operate as a current mode line driver.

An embodiment of the present disclosure is directed to a device for digital communication. The device can include an interface configured to communicate over a protocol having a plurality of output levels. The device can include a first transceiver output configured for proximal connection in series with a near-end termination circuit of a first transmission line. The device can include a second transceiver output configured for distal connection with the near-end termination circuit. The device can include a first select line, configured to enable the first transceiver output. The device can include a second select line, configured to enable the second transceiver output. In a first mode of operation, the first transceiver output can be enabled and the second transceiver output can be disabled. In a second mode of operation, the first transceiver output can be disabled and the second transceiver output can be enabled.

Another embodiment of the present disclosure is directed to a method for digital communication. The method can include receiving, by a selection circuit of a transceiver, a selection corresponding to an output voltage. The method can include generating, by the transceiver, a first output voltage at a first output in series with a near-end termination circuit, responsive to receiving the selection. The method can include generating, by the transceiver, a second output voltage at a second output in parallel with the near-end termination circuit, responsive to receiving the selection. The first output and the second output can connect to a same transmission line.

Yet another embodiment of the present disclosure is directed to a system. The system includes a first line driver. The system includes a second line driver. The system includes a termination circuit intermediating the output of the first line driver and the second line driver. The system includes a selection circuit configured to select an output level for the first line driver and the second line driver.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

Figure 1A:
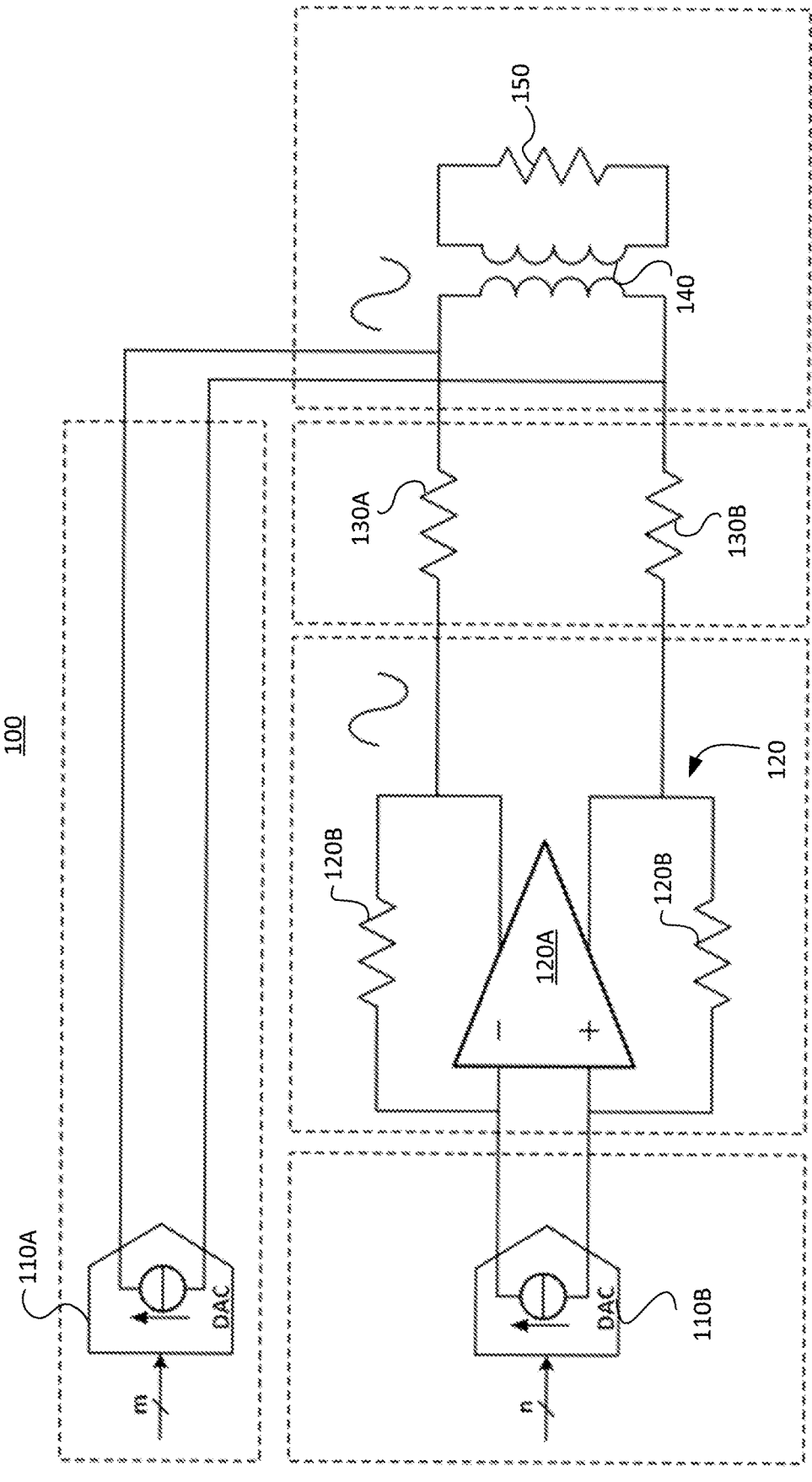
FIG. 1A is a circuit diagram depicting a transmission path, according to some embodiments.

The details of various embodiments of the methods and systems are set forth in the accompanying drawings and the description below.

DETAILED DESCRIPTION

The following IEEE standard(s), including any draft versions of such standard(s), are hereby incorporated herein by reference in their entirety and are made part of the present disclosure for all purposes: IEEE P802.3i™; IEEE P802.3ab™; IEEE P802.3bw™; IEEE P802.11n™; and IEEE P802.11ac™. Although this disclosure may reference aspects of these standard(s), the disclosure is in no way limited by these standard(s).

For purposes of reading the description of the various embodiments below, the following descriptions of the sections of the specification and their respective contents may be helpful:

Section A describes embodiments of systems and methods for a high-performance low-power line-drive; and Section B describes a network environment and computing environment which may be useful for practicing embodiments described herein.

A. High-Performance Low-Power Line-Driver

A high performance line-driver (also referred to herein as a physical layer device (PHY)), may be configured to drive a transmission line in a first mode of operation during periods of low power/voltage demand, and to drive the transmission line in a second mode of operation during periods of high power/voltage demand. For example, the IEEE 802.3ab standard (Gigabit Ethernet) may employ line-drivers supplying signals of various voltages (e.g., 0V, 1V, and 2V). However, a device may also operate the same transceivers at additional, higher voltages, such as to interoperate with legacy devices or modes (e.g., IEEE 802.3i; 10BASE-T). A hybrid driver may be configured to optimize power efficiency during a first mode of operation and maximize an output voltage applied to a transmission line during a second mode of operation for digital communication. Digital communication may refer to communication generated by or resolving to one or more digital values, according to some embodiments. For example, digital communication can include the transmission of individual bits or characters resolvable to corresponding bit values.

Communications between various devices may be controlled by various interfaces. An interface may refer to an assemblage of logic elements configured to control an output state. For example, the interface can include a processor coupled to an transceiver output. For example, a variety of media independent interface standards specify a variety of protocols, such as wired Ethernet protocols. An interface may operate on a single output level (e.g., a transistor to transistor logic level of may be 3.3V, 2.5V, 1.8V, 1.2V, etc.) which may indicate a logic '1' or '0', and an off state such as ground may represent a logic '0' or '1.' However, an interface may be configured to operate with a protocol having a plurality of output levels, drive strengths, etc. For example, the interface may employ various voltage levels, phase shifts, time slices, etc. Alternatively or in addition, an interface may be configured to operate a across a plurality of standards having different output levels. For example, an interface may be configured to operate as a node of a controller area network (CAN), or as a universal asynchronous receiver/transmitter (UART) (e.g., to avoid duplication of device resources, such as buffers and shift registers which may be amendable to operation with a plurality of protocols). Thus, the interface may encode various characters, symbols, etc. which may be provided from the interface to the PHY, which are interpreted by the PHY to transmit a plurality of output levels (e.g., output voltages to a transmission line). In some embodiments, the PHY and the interface may be integrated, such as into a printed circuit board assembly (PCBA), a semiconductor package, a semiconductor die, etc.

Thus, an interface may rely on a PHY capable of applying a signal of sufficient voltage and current to a transmission line to allow reception of a viable signal, which may be defined by a regulatory body, such as the IEEE, or by an experimental model, such as an eye diagram or a packet loss rate. In some embodiments, the transmission line may be a wired connection, such as an wired Ethernet connection. In some embodiments, the transmission line may be adaptable to various transmission power levels, as in the case of Green Ethernet. Although many embodiments are configured to drive wired transmission lines, some transmission lines may comprise wireless transmission lines, which may also require a PHY to apply a signal of sufficient voltage and current to operate various wireless transceivers at a desired voltage and/or power level. A transceiver may refer to a device configured to transmit or receive data over a transmission line, according to some embodiments. A transmission line may refer to a connection between a plurality of transceivers. For example, a transmission line may refer to an Ethernet cable, a board to board connection, chip to chip connection, or the like.

Some line-drivers operate in a "current-mode" wherein a termination resistance is placed in parallel with a signal transformer. Advantageously, substantially all of the output voltage of the line-driver is placed across the signal transformer, resulting in a high power delivered across the signal transformer (i.e., to the transmission line). However, such an embodiment may result in high power use. In some embodiments, about half the power will be dissipated by the near-end termination resistance. The high power use may be undesirable in some applications, such as thermally limited devices, battery powered devices, etc.

Some line-drivers operate in a "voltage-mode" wherein a termination resistance is placed in series with the signal transformer. Advantageously, only a portion of the device output voltage is seen across the termination resistance, resulting in relatively low power loss from the output termination resistance. However, because only a portion of the device output voltage is seen across the signal transformer, in some embodiments, a lower transmission power may be disadvantageous (e.g., in embodiments requiring a maximum transmission power delivered to the transmission line).

Because modern semiconductor devices are continually decreasing supply voltages, it may be advantageous to reduce an operating voltage of a physical layer driver (i.e., a PHY) and other devices, (e.g., to minimize the cost or complexity of a device by avoiding additional power supplies). However, modern and legacy communications standards may employ relatively high transmission voltages, including fast swings between various output levels. For example, many modern transmission standards may encode various voltages into the voltage levels and/or phases transmitted, employing high transmit voltages and currents.

FIG. 1A is a circuit diagram depicting a transmission path 100, according to some embodiments. The transmission path 100 comprises a near-end current-mode line-driver 110A, which may be a digital to analog converter (DAC) such that the current-mode line-driver 110A receives a plurality of digital signals from an interface, and outputs a plurality of output levels to the signal transformer 140 or is otherwise conveyed to a transmission line. The transmission line may be depicted as an equivalent resistance 150 or other impedance. An output level may refer to a voltage level, time, drive strength, or other physical layer signal, according to various embodiments. The output from the current-mode line-driver 110A can thus be applied to a receiving device across the transmission line. The signal transformer 140 may provide voltage stepping (i.e., stepped up or stepped down) and/or isolation between the line-driver and the transmission line. In some embodiments, the signal transformer 140 may be absent. For example, a line-driver may be capacitively coupled to the transmission line (e.g., for an intra-PCBA Ethernet link) or directly coupled to the transmission line (e.g., for a UART).

A pair of termination resistors 130A-B are disposed between the output of the near-end current-mode line-driver 110A, and an amplifier 120. The amplifier 120 may be selected for a low output impedance (e.g., may be an operational amplifier having negligible output impedance). Thus, the termination resistors 130A-B may be, from the perspective of the near-end current-mode line-driver 110A, in series with each other and in parallel with the signal transformer 140. For example, where the termination resistors 130A-B are 50Ω resistors, near-end current-mode line-driver 110A may see a single 100Ω parallel termination. As discussed below, with regard to the near-end voltage-mode line-driver 110B, the amplifier 120 may be absent in some embodiments, however, in many such embodiments, the circuit may nonetheless enable the termination resistors 130A-B, or a substantially similar termination resistance to be present as seen by the current-mode line-driver 110A. Thus, the near-end current-mode line-driver 110A may operate as a traditional current-mode driver.

Although depicted as a purely resistive termination, for simplicity, in some embodiments, the termination impedance may be a complex impedance (i.e., may have reactive components). For example, some terminations may comprise inductors which may be integrated with another component, for example, the signal transformer 140. In some embodiments, the current-mode line-driver 110A may be connected to a first portion of the termination impedance in series, and a second portion of the termination impedance in parallel. In some embodiments, at least a substantial portion of the near-end termination resistance 130A-B may not be seen by the current-mode line-driver 110A. For example, the outputs of the amplifier or another device may be placed into a high impedance state which may, advantageously, increase the current delivered to the transmission line (e.g., through the signal transformer 140). However, such an circuit may result in various artifacts (e.g., reflections) which may, in some embodiments, negatively impact the signal integrity of the transmission path.

A near-end voltage-mode line-driver 110B may also drive the circuit (in addition to or instead of other line drivers). The voltage-mode line-driver 110B may be a separate circuit on a similar device (e.g., the same semiconductor die, the same package, the same PCBA, etc.), may be the same device, or may be a distinct device. In some embodiments, the two or more line-drivers may be selectively populated based on an intended application. Where two devices are populated to drive the same line, or where one device is populated having two or more modes of operation, a selection between the various modes or devices may be implemented as is discussed with regard to FIG. 2, below. In some implementations, two line-drivers may be substituted with similar circuits as those which are further integrated.

The near-end voltage-mode line-driver 110B may drive the signal transformer through the termination resistors 130A-B directly, or via an intervening amplifier, such as the depicted transimpedance amplifier 120. The transimpedance amplifier 120 may comprise an operational amplifier 120A and one or more feedback resistors 120B which may cause the transimpedance amplifier 120 to apply a voltage across the signal transformer 140 through the termination resistors 130A-B in response to a current delivered to an amplifier. In some implementations, amplifiers, buffers, etc. may be used to drive various transmission lines and termination complexes. For example, in one embodiment, the amplifier may be a voltage follower, and the signal transformer 140 may step the voltage up to a desired transmission line voltage, or the voltage-mode line-driver 110B may directly output one or a plurality of transmission line voltages. In various embodiments, devices may be held in a controlled impedance state, or additional circuitry may be provided to avoid interference with the operation of the current-mode line-driver 110A. For example, if the output of the amplifier was in a high impedance state, an additional transistor, relay, etc. could connect the two resistors through a low impedance path.

As depicted, each of the current-mode line-driver 110A and the voltage-mode line-driver 110B can receive one or more input voltage levels from the interface. For example, the input voltage levels can be received via a digital input signal for a symbol (e.g., bit, character, constellation, or the like). The various line drivers can receive a symbol associated with a voltage level. In some embodiments, the symbol may also be indicative of a phase shift, time slot, or the like. In some embodiments, the voltage-mode line-driver 110B can receive a greater number of voltage level relative to the current-mode line-driver 110A. For example, the voltage-mode line-driver 110B can receive an indication for symbols employing 4 bit phase amplitude modulation (PAM-4), 16 bit PAM (PAM-16), or the like. A corresponding current-mode line-driver 110A can receive an indication to operate at one or more voltage levels (e.g., 2.5V operation or High-Z operation; 2.0V operation, 2.5V operation, or High-Z operation; or so forth).

An associated interface can provide the signal to selectively switch between communication protocols. A protocol may refer to a predefined rule set for communication between digital devices, according to various embodiments. The protocol may include voltage levels, or a relationship between a physical and data layer. A type of a protocol may refer to a selected protocol or group of protocols (e.g., Ethernet, CAN, etc.). For example, the interface can selectively engage one of the current-mode line-driver 110A or voltage-mode line-driver 110B based on a selected protocol (e.g., according to a strapping resistor, configuration register, or the like). Thus, bit-by-bit or symbol-by-symbol operation can proceed at a selected one of the current-mode line-driver 110A or voltage-mode line-driver 110B. According to some embodiments, the interface can engage one of the current-mode line-driver 110A or voltage-mode line-driver 110B based on a signal level of a particular bit or symbol. For example, the interface can include a threshold to compare the various voltages of the symbols to. For example, the threshold can include a threshold voltage value to compare individual voltage levels, look up table (LUT) to associate symbols with one or more line-drivers, or so forth. A symbol may refer to a single bit or multi-bit character which can include one or more voltage levels, frequencies, time slices, or the like, according to various embodiments. The symbol may relate a physical level of a link to a data link level of the state.

Figure 1B:
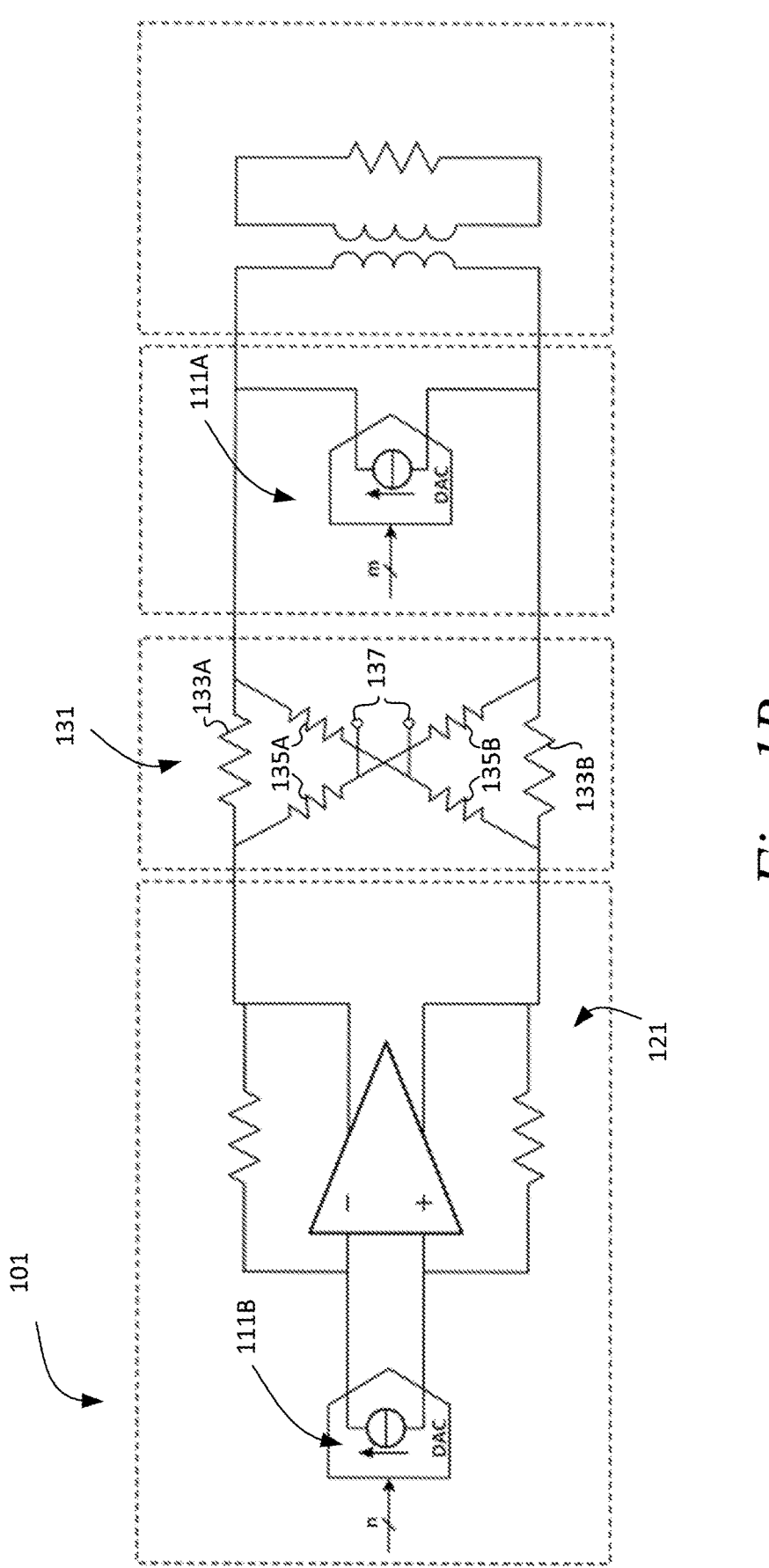
FIG. 1B is a circuit diagram depicting a transmission path having an alternate termination network, according to some embodiments.

FIG. 1B is another circuit diagram depicting a transmission path 101, according to some embodiments, in which the termination resistors 130A-B of FIG. 1A are replaced with a hybrid termination network 131 which may, advantageously, provide far-end termination for a transceiver located across a transmission line. The hybrid termination network 131 may intermediate a first DAC 111A (e.g., a DAC connected to a transmission line in a current-mode) and a second DAC 111B (e.g., a DAC connected in a voltage-mode). In some implementations, in addition to the substitution of various termination networks, various amplifiers (e.g., the amplifier 121) may be included, omitted, or modified including a class A or B or AB transimpedance amplifier, or another type of amplifier, or may be omitted wherein the line-driver (e.g., DAC) provides sufficient drive strength and voltage output to drive a signal to a transmission line. A DAC may refer to a device capable of generating a variable voltage signal from one or more digital inputs of a same voltage level. For example, a DAC can generate an analog signal level based on a received digital value.

Referring again to the hybrid termination network 131, the network can include termination resistors 133A-B corresponding to the termination resistors 130A-B depicted in FIG. 1A. A first pair of resistors 135A connects to opposite ends of a first termination resistors 130A and a second pair of resistors 135B connects to a second termination resistor 130B. An input 137 (e.g., a differential input) can be configured to receive an input signal. The input 137 can each intermediate respective resistors of the first resistor pair 135A and second resistor pair 135B. "Input" may refer to a conductor for a signal conveyed to a transceiver, according to some embodiments. For example, the input may connect to a transmission line such as a dedicated twisted pair, and receive data therefrom. The input signal can be received according to a timesharing scheme with at least one DAC (e.g., the second DAC 111B). For example, the first DAC 111A can operate concurrently with the second DAC 111B (or the first DAC 111A can operate during non-operation of the second DAC 111B) to generate link pulses for an Ethernet network. Upon an establishment of a connection, the first DAC 111A may enter an off state such as a high-Z state whereupon the second DAC 111B can drive the line for duplex operation with the information received.

The DAC 111B, or other line-drivers disclosed herein may be of varying type. For example, the DAC 111B may receive a number of bits which selectably control an output voltage, or an output current. In either instance, an amplifier may or may not condition the signal prior to introduction to a transmission line. For example, transimpedance amplifier 121 may condition the signal from a line-driver having controllable current to introduce a defined voltage to the transmission line. A fixed gain amplifier (e.g., having a gain of 0.5, 1, or 2) may apply a voltage to the transmission line based on the voltage of the output of the line driver. Various additional combinations are possible, and may be selected according to available supply voltages, currents, for operation with available transformers, etc. A line driver may refer to a digital device capable of driving a transmission line or an intermediate device. For example, a line driver can include a differential transceiver, a transistor-to-transistor logic device, or the like, according to various embodiments. For example, a line driver can include a DAC, a transimpedance amplifier, or a combination of a DAC and a transimpedance amplifier.

Figure 1C:
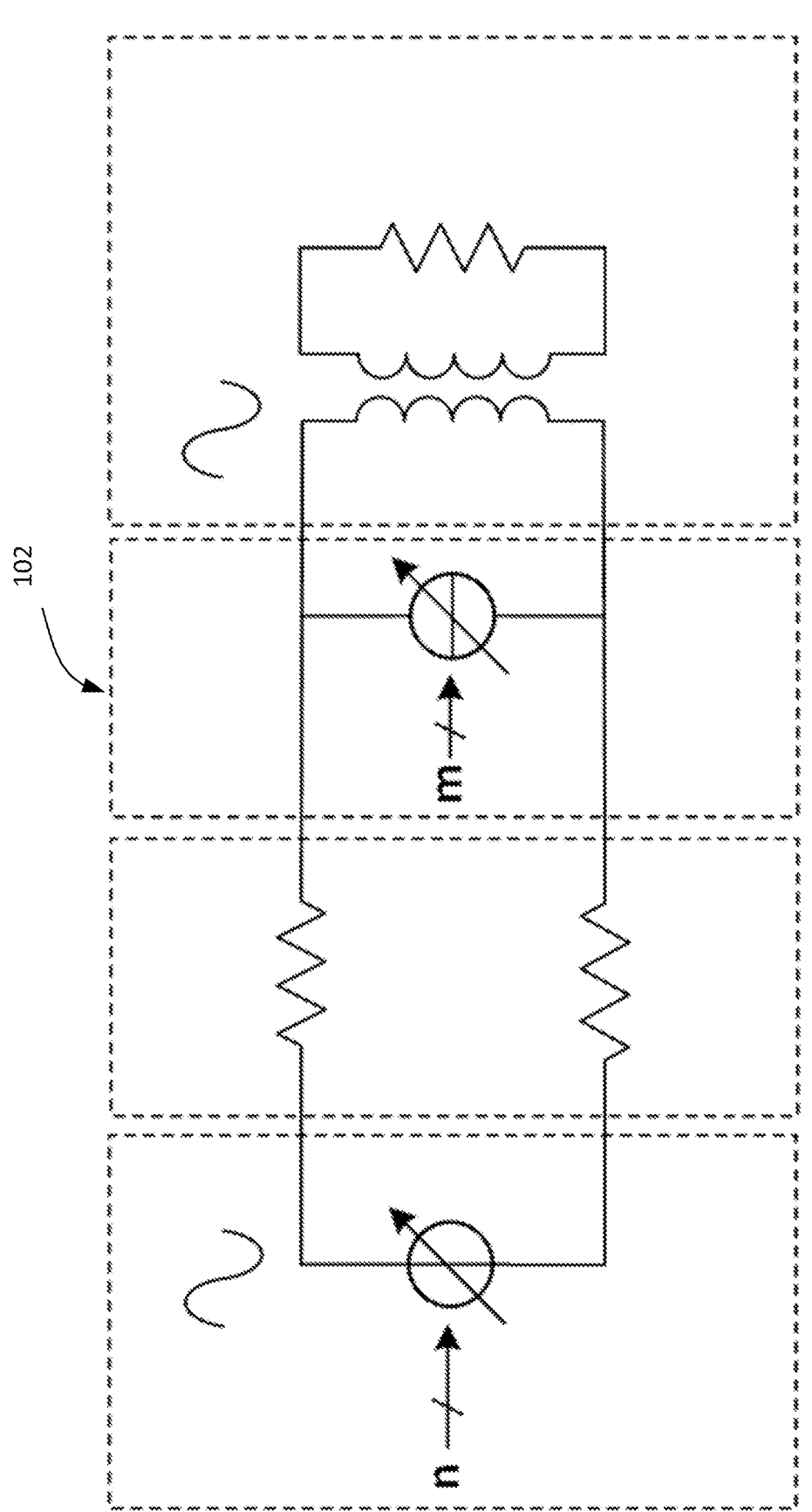
FIGS. 1C and 1D are additional circuit diagrams depicting a transmission path, according to some embodiments.
Figure 1D:
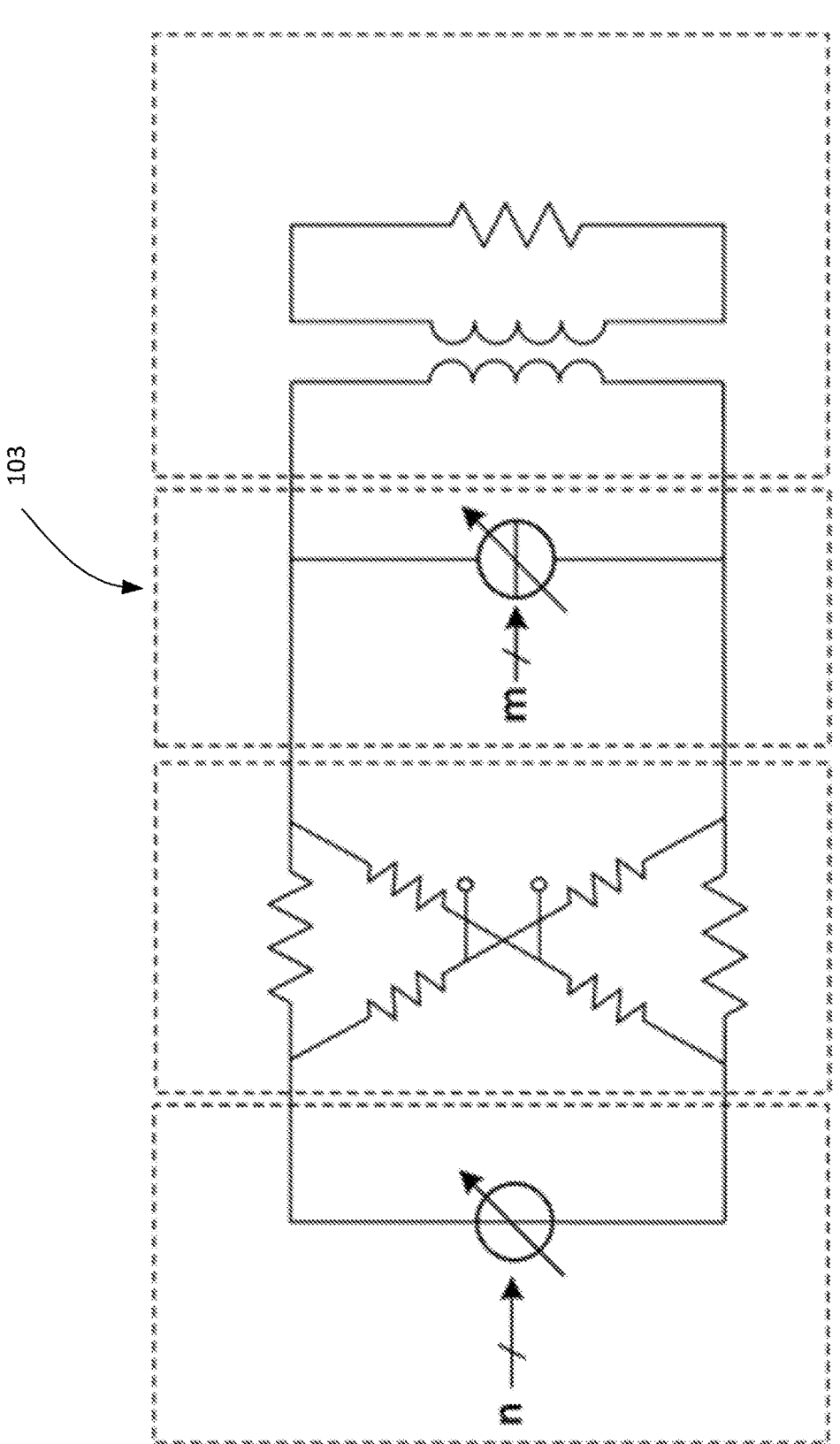

FIGS. 1C and 1D depict additional transmission paths 102, 103, according to some embodiments, in which no amplifier is depicted, as has already been discussed with reference to FIGS. 1A and 1B. Further, the plurality of line drivers are shown more generally than the DAC's of FIGS. 1A and 1B. As discussed above, however, the circuit depictions are intended to clearly depict a series of logical connections, and do not necessarily relate to a physical disposition of the components thereof. These additional depictions are merely intended to provide additional examples which may be generated from the various substitutions, variations, etc. which are discussed herein.

Figure 2A:
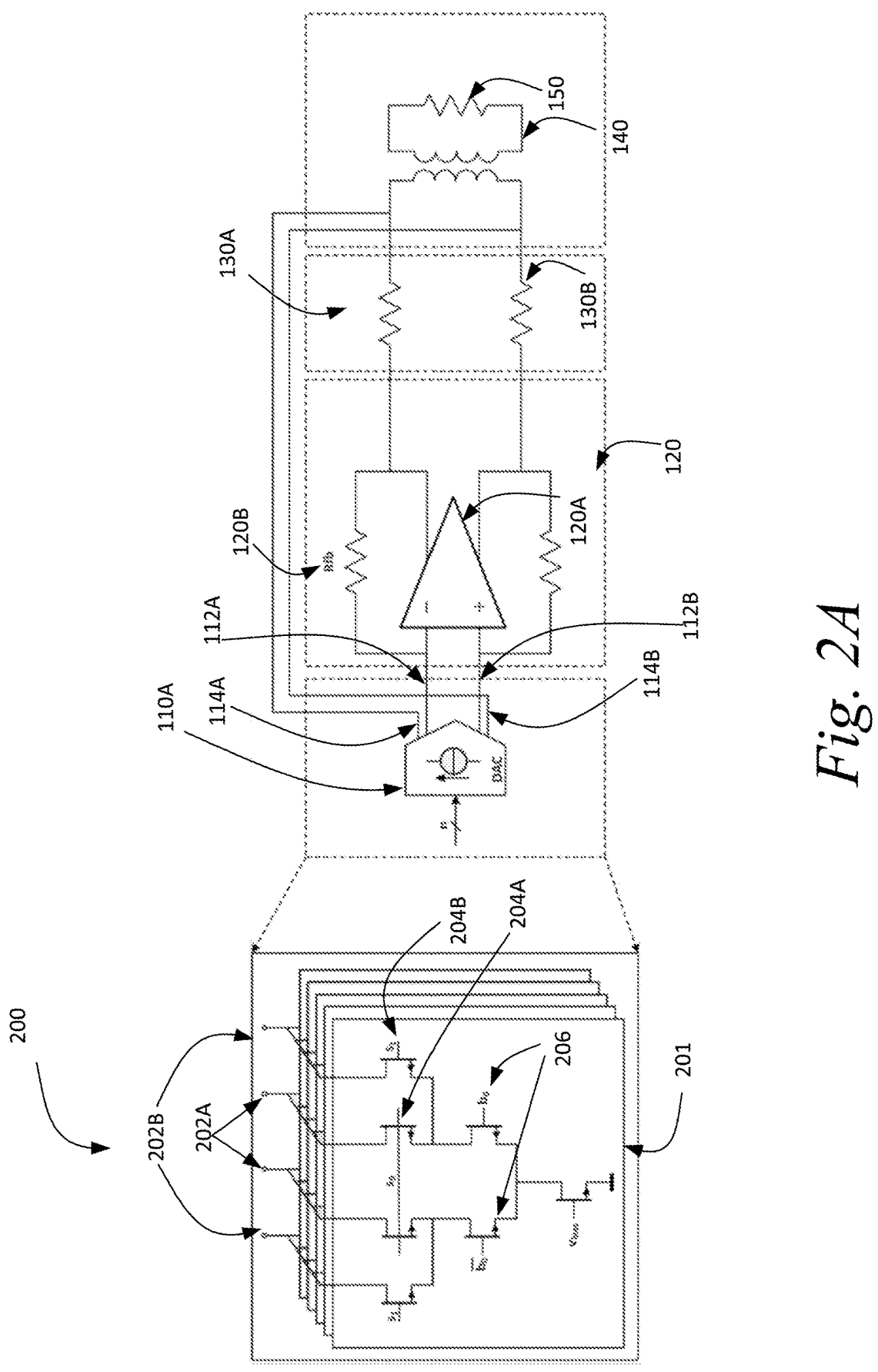
FIG. 2A is another circuit diagram depicting a transmission path, according to some embodiments.

FIG. 2A is another circuit diagram depicting a transmission path 200, according to some embodiments. In the depicted embodiment, a single line-driver (e.g., a DAC 110A) is configured to operate as a current-mode line-driver, and as a voltage-mode line-driver. In some embodiments, the line-driver may be configured to operate both sets of outputs simultaneously in an additive fashion, to allow a signal strength greater than either output alone. In some embodiments, the line-driver will be operated alternatively, between the two modes. Advantageously, such an embodiment may minimize a required number of line-drivers, and may minimize a total number of resources used (e.g., by the removal of any redundant components of the respective line-drivers).

A line-driver configured to avoid simultaneous operation of the two modes may operate with a lower maximum power use, and each input may be switched by a mutually exclusive circuit, reducing a potential number of modes of operation which may, in turn, reduce qualification and test time, increase reliability, etc.

FIG. 2A further depicts a selection circuit 201 comprising a first set of outputs, 202A which are selected by a first select line 204A. A select line may refer to a conductor for a signal conveyed to select an output level of a transceiver, according to some embodiments. For example, the select line can include a copper interconnect, transistor gate, or so forth. If the outputs are not selected, they may be left in a high impedance state, and may be pulled up or pulled down to a default value, as may the various components herein. A second set of outputs 202B is selected by a second select line 204B. In some embodiments, additional or fewer outputs may be employed. The various outputs 202 can connect to the inputs of the depicted DAC 110A. For example, the outputs of the selection circuit 201 can select a voltage for one or more output (e.g., output pairs) of the DAC 110A to cause the DAC 110A to output a selected voltage in voltage mode to the series resistors 130 or in voltage mode to the transmission path 200 distal to the series resistors 130, and onward to a signal transformer 140 connected to a trans- mission line and corresponding receiving transceiver as depicted as an equivalent resistance 150. In various embodi- ments, the selection circuit can provide inputs to various DAC or other line driver components (e.g., to a first and second DAC). A selected output can receive a drive voltage from a paired set of source/sink terminals 206. The depicted terminals supply positive and negative voltages, which may enable a differential output to one or more sets of selected outputs. A plurality of selection circuits may drive one or more outputs (or sets of outputs) in order to scale an output current (e.g., select a drive strength), which may, in turn, cause the amplifier 120 to scale an output voltage.

In some implementations, various selection circuits 201 for selecting various modes of operation may be employed. For example, a selection circuit 201 for a single ended device may comprise single ended outputs; a circuit intended to operate two sets of outputs in a mutually exclusive manner may comprise a single select line and varying transistor types for each output, or the first select line 204A and the second select line 204B may be an inverted and non-inverted output from a common source. In some embodiments, the line-driver may include the selec- tion circuit 201. For example, the line-driver may be a DAC, with output voltages of 1V, 2V, and 2.5V. Such an embodi- ment may receive digital input signals selecting an output voltage. Wherein the 1V or 2V level is selected, the line- driver 110 may enable a first set of outputs 112. Wherein the 2.5V level is selected, the line-driver 110 may enable a second set of outputs 114. Advantageously, such embodi- ments may operate transparently with additional devices not implementing the systems and methods discussed herein (i.e., an associated interface may disregard the various modes of operation). In the case of a DAC, input signals may be repurposed as mode selects directly (e.g., the upper bit of an input may control a select line), or a plurality of bits may be combined by logic gates as to control the output mode. Some embodiments may include multi-bit characters, sym- bols, etc., and may require further processing to derive various select lines from an interface, but may nonetheless operate without any explicit commands from the interface to enable or disable various modes of operation. In some embodiments, the line-driver and interface may be inte- grated onto a single semiconductor chip or device package.

In some embodiments, the mode selection of the line- driver may not occur transparently with respect to the interface. For example, the mode selection of the line-driver may be reported to and/or commanded from the interface directly. Advantageously, such embodiments may allow the interface and/or any associated software or devices to selec- tively engage a mode of operation. For example, if a communication link (e.g., 10BASE-T) is intended for opera- tion at 2.5V, and a line-driver 120 must operate as a current-mode line-driver to apply a 2.5V signal to the transmission line, an associated interface (e.g., in response to a packet loss rate, a user command, a configuration file, a hardware strap, etc.) may nonetheless indicate that the line-driver 120 should operate in a voltage-mode. Such embodiments may reduce energy use relative to higher power embodiments where an associated data link may operate acceptably, and at a lower power than if operating in a current-mode. In some embodiments, a mode of operation may be selected to adjust a signal strength (e.g., voltage, drive strength, etc.) responsive to a performance of a trans- mission line (e.g., to transmit additional distances, encode additional information within a data stream, etc.). For example, the signal strength can be adjusted responsive to a receipt of a bit error rate, packet error rate, pathloss, or so forth.

Figure 2B:
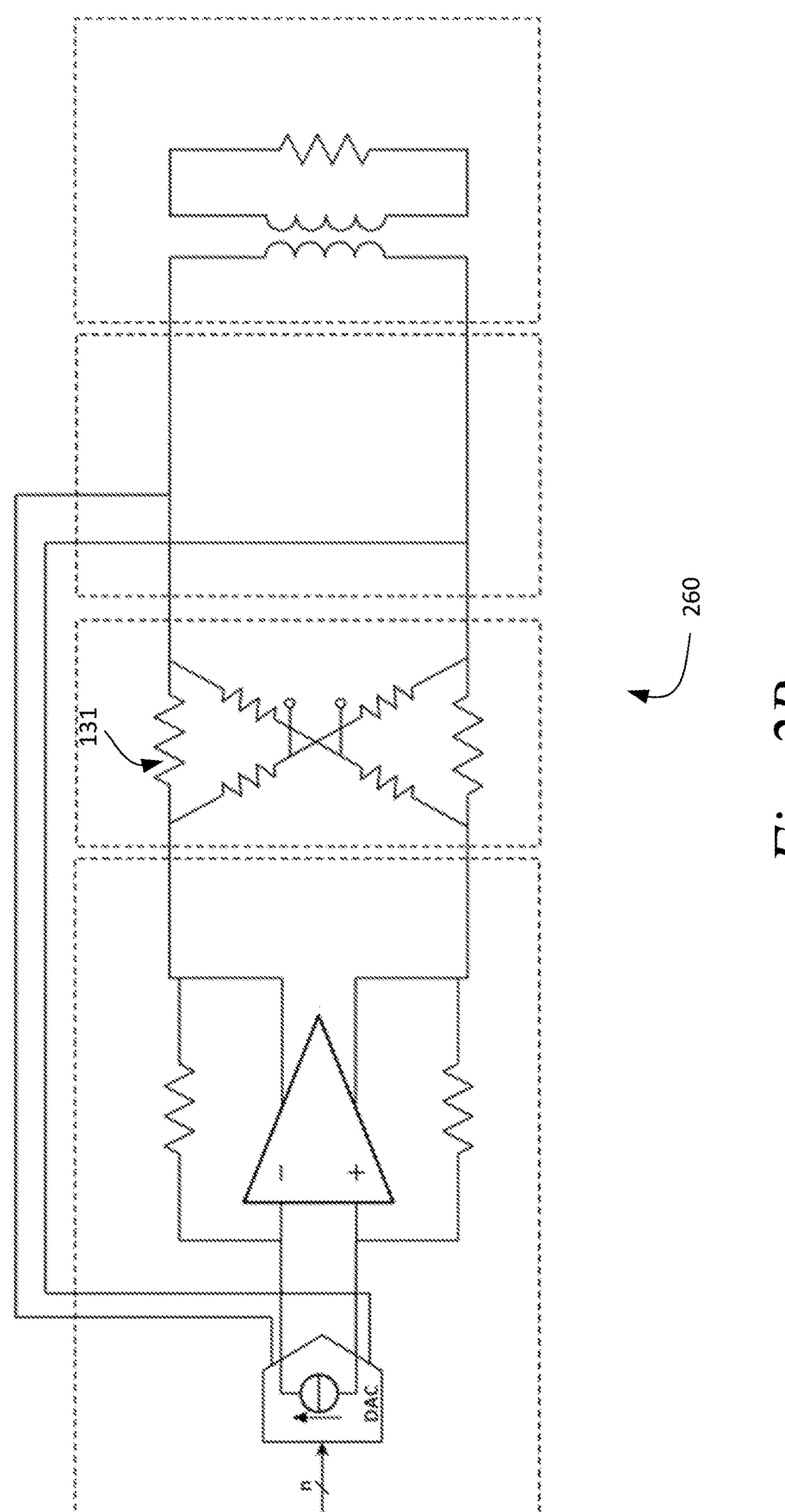
FIG. 2B is a is a circuit diagram depicting a transmission path having an alternate termination network, according to some embodiments.

FIG. 2B depicts an additional transmission path 260 having a hybrid termination network 131, according to some embodiments, as discussed in regards to FIG. 1B. The transmission path 260 is driven by a single DAC 110A connected to an amplifier 120. The single DAC 110A includes first outputs connecting to a proximal side of the termination network 131 and second outputs connecting to a distal side of the termination network 131, as discussed with regard to FIG. 2A. The depiction is intended to provide an additional example which may be generated from varia- tions of the embodiments which have already been dis- closed. Indeed, while the various examples provided herein are intended to be illustrative, they are not intended to be limiting; the portions of the various disclosed systems and methods herein can be substituted, omitted, added, or modi- fied to generate various further embodiments which are not explicitly described. A termination network may refer to an impedance disposed along or parallel to a transmission line, and may be designed or operative to improve signal integrity along the transmission line, according to various embodi- ments. For example, the termination network may reduce reflections along the transmission line or align a terminus resistance with a characteristic impedance of a transmission line. The termination network may also be referred to as a termination circuit, either of which may refer to an imped- ance at disposed along a transmission line to damp undesired signals, according to some embodiments. For example, a termination circuit can include resistors disposed at or near opposite ends of a transmission line to damp unwanted reflections.

Throughout this disclosure, frequent reference is made to various wired Ethernet standards organized under various IEEE 802.3 standards. Indeed, the various circuits depicted herein may be suited to operate over such connections. For example, the devices of FIGS. 1A-D and FIGS. 2A-2B may be configured to pass differential signals, such as those of a two-wire Ethernet circuit (e.g., automotive Ethernet, IEEE P802.3bw), or as a subcomponent of a 4 or 8 wire Ethernet circuit. However, these examples are not intended to be limiting. Some embodiments may employ single-ended communication links. Many communication standards oper- ate at voltage levels which may vary, and which may require relatively high voltages. For example, legacy standard such a RS422/485, CAN, etc. may also be transmitted by embodi- ments of the present disclosure. Further, such some embodi- ments may be suited to various implementations which are not based on published standards as may be developed to benefit from the range and control of output voltages enabled.

The depicted location of various devices in the associated figures is merely for ease of reference, and need not repre- sent the physical location of distinct physical components. For example, various components may be integrated into a single component, including those which are adjacent and/or non-adjacent in the figures provided herein. For example, all of the components may be integrated onto a semiconductor die, or all of the components of a near end transmitter may be integrated onto a semiconductor die, or all of the com- ponents of a near end transmitter may be integrated onto one of a semiconductor die or a separate magnetics package (e.g., comprising the signal transformer).

Figure 3:
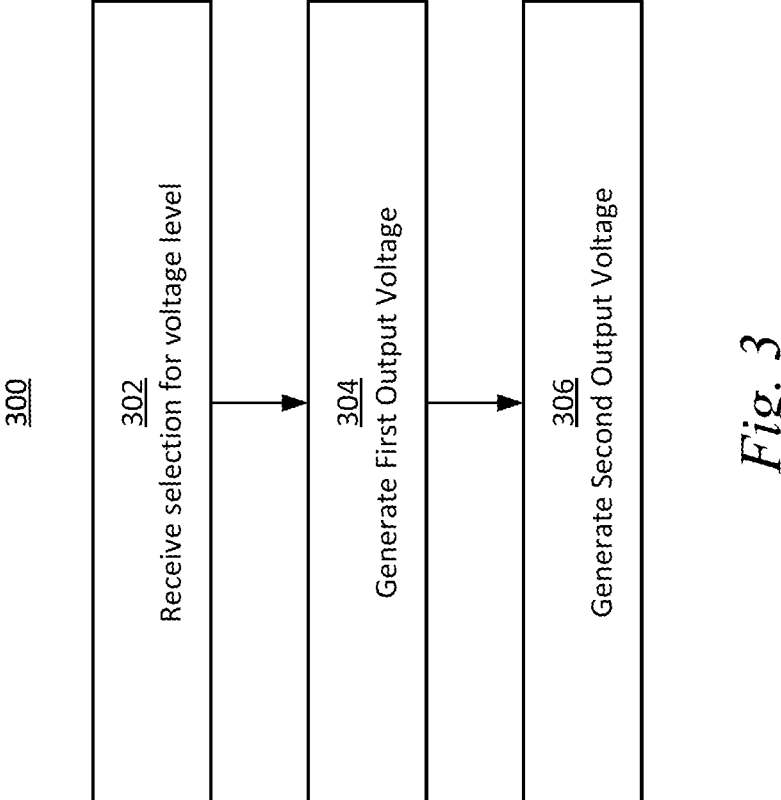
FIG. 3 is a flow diagram for a method of digital communication, according to some embodiments.

Referring now to FIG. 3, a method 300 for digital communication is presented, according to some embodiments. In brief summary, the method 300 includes receiving a selection for a voltage level at operation 302. At operation 304, a first output voltage is generated. At operation 306, a second output voltage is generated. According to various embodiments, the operations described herein can be performed in various sequences, or operations can be added, omitted, substituted or modified. The method 300 can be employed with line drivers disclosed herein, or other line drivers. For example, the method 300 can be employed with single ended or differential DACs, voltage followers, or so forth.

Referring again to operation 302, a selection corresponding to an output voltage is received. For example, the selection can include a digital representation of a voltage level. A range of selection values can include a first portion of values which exceed a threshold, and a second portion of values which do not exceed the threshold. The selection (e.g., a value thereof) may correspond to an output voltage for a transceiver. The first portion of values can be indicative of a voltage level which can be generated by a first output of a transceiver. For example, the first portion of values can correspond to a signal for gigabit Ethernet, which are less than 2V. The second portion of values can be indicative of a value which is greater than the first portion of values. For example, the second portion of values can correspond to a link pulse signal, or a data signal for a 10Base-T communication protocol. An output of a transceiver, or "transceiver output" may refer to an interface between a transceiver and a transmission line at which the transceiver imparts energy to the transmission line, according to some embodiments. For example, a transceiver can include one or more outputs to impart energy to as transmission line at various voltage or current levels. A transceiver output can include various output stages such as an output which is coupled to a transmission line through another portion of the transceiver. For example, the transceiver output can include a DAC output connected to a transimpedance amplifier of the transceiver.

In some embodiments, the second portion of values can include a sub-portion of which are generated by a combination of the first outputs and the second outputs. In various embodiments, the digital representation may depict a character, voltage level, or the like. In various embodiments, the first and second portion of values may be provided to a same device having multiple outputs or to multiple devices. The transceiver can include at least one DAC to generate the output voltage levels from a selection (e.g., from a selection including a digital representation of a desired voltage), such as a media independent interface (MII).

Referring again to operation 304, a first output voltage is generated. The first output voltage can be an output voltage of a first output of the transceiver. The first output voltage may be generated by a voltage mode line driver such as a DAC which may be, include, or interface with an amplifier such as a trans-impedance amplifier to generate the first output voltage. The first output voltage can be output to a termination network intermediating the transceiver from a transmission line. The portion of a circuit intermediated by the termination network may be referred to as "proximal" with respect to the transceiver, according to some embodiments. "Proximal connection" may refer to a connection on a proximal side of an intermediating circuit or portion thereof "Intermediated" may refer to a location disposed along a signal path, the signal path extending between relevant elements, according to some embodiments. For example, first and second terminals which are intermediated by a resistor include a signal path traversing the resistor. When more than one termination network intermediate the transceiver and a corresponding transceiver, the closer termination network may be referred to as or "near-end" and the further termination network may be referred to a as "far end." Wherein the output signal traverses the termination network to reach the transmission line, the output may be referred to as in series with the termination network. For example, at least a portion of the termination network disposed along a signal transmission path between the a transmitting transceiver and a corresponding receiving transceiver may be referred to as in series (e.g., because a signal emanating from the output from the transceiver to the transmission line is in series with the output from the transceiver to the termination network).

In various embodiments, operation 304 may be performed at a same time as operation 306, or separately therefrom. For example, the first outputs and second outputs can operate simultaneously or sequentially (e.g., according to a received character of a bit stream). For separately operating outputs, a non-active output can enter a state to avoid contention with any active outputs. For example, current-mode outputs can enter a high-z state such that the voltage-mode outputs can control a voltage of the transmission line. The voltage-mode output can enter a low-impedance state such that the current-mode outputs can interface with a termination resistor in parallel. A low impedance state may refer to an impedance which is low at an output, according to some embodiments. For example, a differential output having low output impedance may substantially connect the differential outputs thereof. An inactive output may refer to either of a low-impedance state or a high-Z state, such that the output does not control the state of the transmission line, according to various embodiments. A high-z state (also referred to as a high impedance state) may refer to an output impedance which substantially isolates an output from a signal path such as a bus, transmission line, or the like, according to various embodiments.

Referring again to operation 306, a second output voltage is generated. The second output voltage can be an output voltage of a second output of the transceiver. The second output voltage can be provided to a termination network which is in parallel with the near end termination resistance of a near-end termination circuit. The portion of a circuit not intermediated by the termination network may be referred to as "distal" with respect to the transceiver, according to some embodiments. "Distal connection" may refer to a connection on a distal side of an intermediating circuit or portion thereof. Wherein the output signal does traverses the termination network, but such a termination network does not intermediate the transceiver from the transmission line, the output may be referred to as in parallel with the termination network (e.g., because a signal emanating from the output from the transceiver to the transmission line is in parallel with the output from the transceiver to the termination network).

B. Computing and Network Environment

Figure 4A:
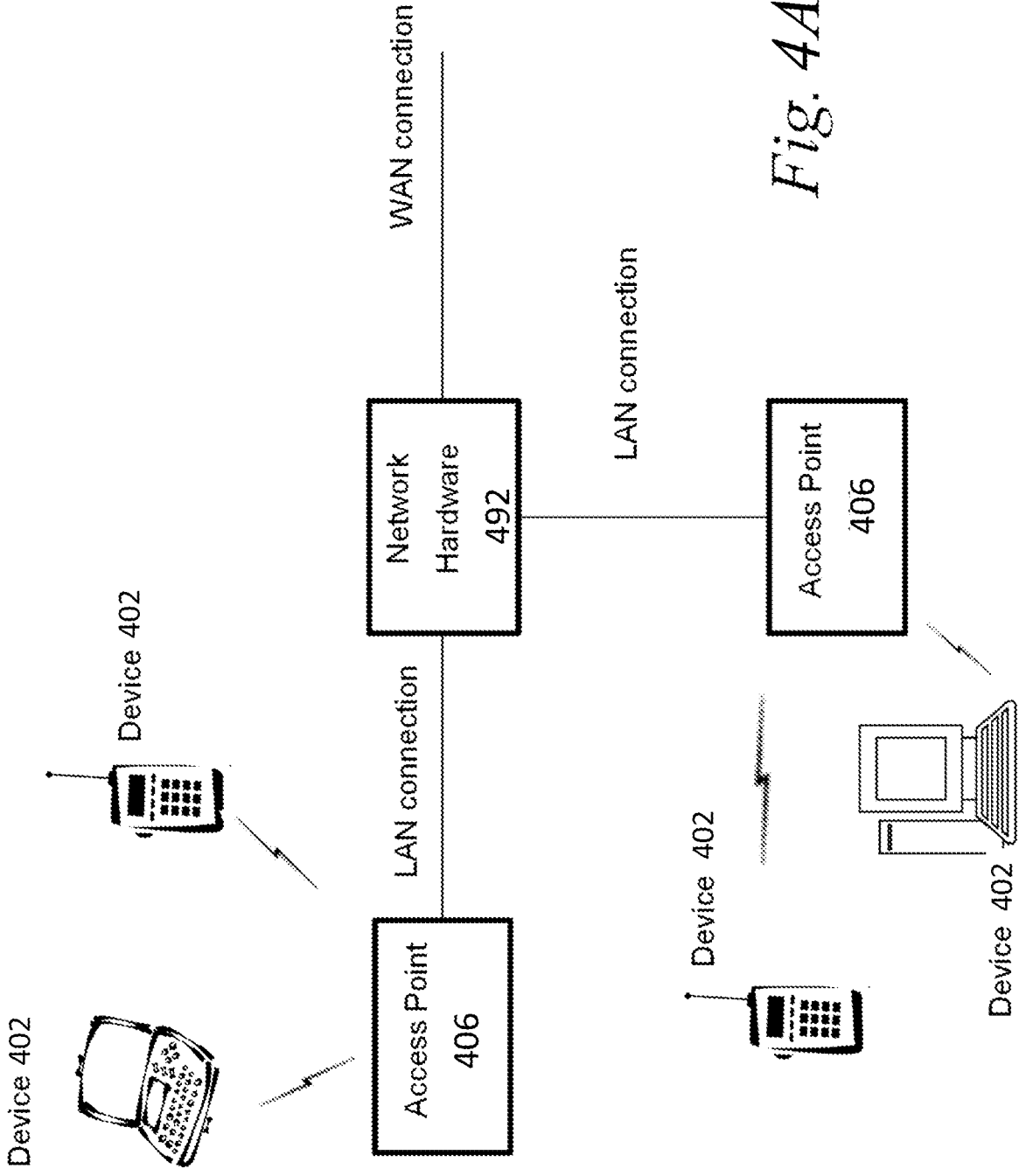
FIG. 4A is a block diagram depicting an embodiment of a network environment including one or more access points in communication with one or more devices or stations.

Having discussed specific embodiments of the present solution, it may be helpful to describe aspects of the operating environment as well as associated system components (e.g., hardware elements) in connection with the methods and systems described herein. Referring to FIG. 4A, an embodiment of a network environment is depicted. In brief overview, the network environment includes a wireless communication system that includes one or more access points 406, one or more wireless communication devices 402 and a network hardware component 492. The wireless communication devices 402 may for example include laptop computers 402, tablets 402, personal computers 402 and/or cellular telephone devices 402. The details of an embodiment of each wireless communication device and/or access point are described in greater detail with reference to FIGS. 4B and 4C. The network environment can be an ad hoc network environment, an infrastructure wireless network environment, a subnet environment, etc. in one embodiment The access points (APs) 406 may be operably coupled to the network hardware 492 via local area network connections. The network hardware 492, which may include a router, gateway, switch, bridge, modem, system controller, appliance, etc., may provide a local area network connection for the communication system. Each of the access points 406 may have an associated antenna or an antenna array to communicate with the wireless communication devices 402 in its area. The wireless communication devices 402 may register with a particular access point 406 to receive services from the communication system (e.g., via a SU-MIMO or MU-MIMO configuration). For direct connections (e.g., point-to-point communications), some wireless communication devices 402 may communicate directly via an allocated channel and communications protocol. Some of the wireless communication devices 402 may be mobile or relatively static with respect to the access point 406.

In some embodiments an access point 406 includes a device or module (including a combination of hardware and software) that allows wireless communication devices 402 to connect to a wired network using Wi-Fi, or other standards. An access point 406 may sometimes be referred to as an wireless access point (WAP). An access point 406 may be configured, designed and/or built for operating in a wireless local area network (WLAN). An access point 406 may connect to a router (e.g., via a wired network) as a stand-alone device in some embodiments. In other embodiments, an access point can be a component of a router. An access point 406 can provide multiple devices 402 access to a network. An access point 406 may, for example, connect to a wired Ethernet connection and provide wireless connections using radio frequency links for other devices 402 to utilize that wired connection. An access point 406 may be built and/or configured to support a standard for sending and receiving data using one or more radio frequencies. Those standards, and the frequencies they use may be defined by the IEEE (e.g., IEEE 802.11 standards). An access point may be configured and/or used to support public Internet hotspots, and/or on an internal network to extend the network's Wi-Fi signal range.

In some embodiments, the access points 406 may be used for (e.g., in-home or in-building) wireless networks (e.g., IEEE 802.11, Bluetooth, ZigBee, any other type of radio frequency based network protocol and/or variations thereof). Each of the wireless communication devices 402 may include a built-in radio and/or is coupled to a radio. Such wireless communication devices 402 and/or access points 406 may operate in accordance with the various aspects of the disclosure as presented herein to enhance performance, reduce costs and/or size, and/or enhance broadband applications. Each wireless communication devices 402 may have the capacity to function as a client node seeking access to resources (e.g., data, and connection to networked nodes such as servers) via one or more access points 406.

The network connections may include any type and/or form of network and may include any of the following: a point-to-point network, a broadcast network, a telecommunications network, a data communication network, a computer network. The topology of the network may be a bus, star, or ring network topology. The network may be of any such network topology capable of supporting the operations described herein. In some embodiments, different types of data may be transmitted via different protocols. In other embodiments, the same types of data may be transmitted via different protocols.

Figure 4B:
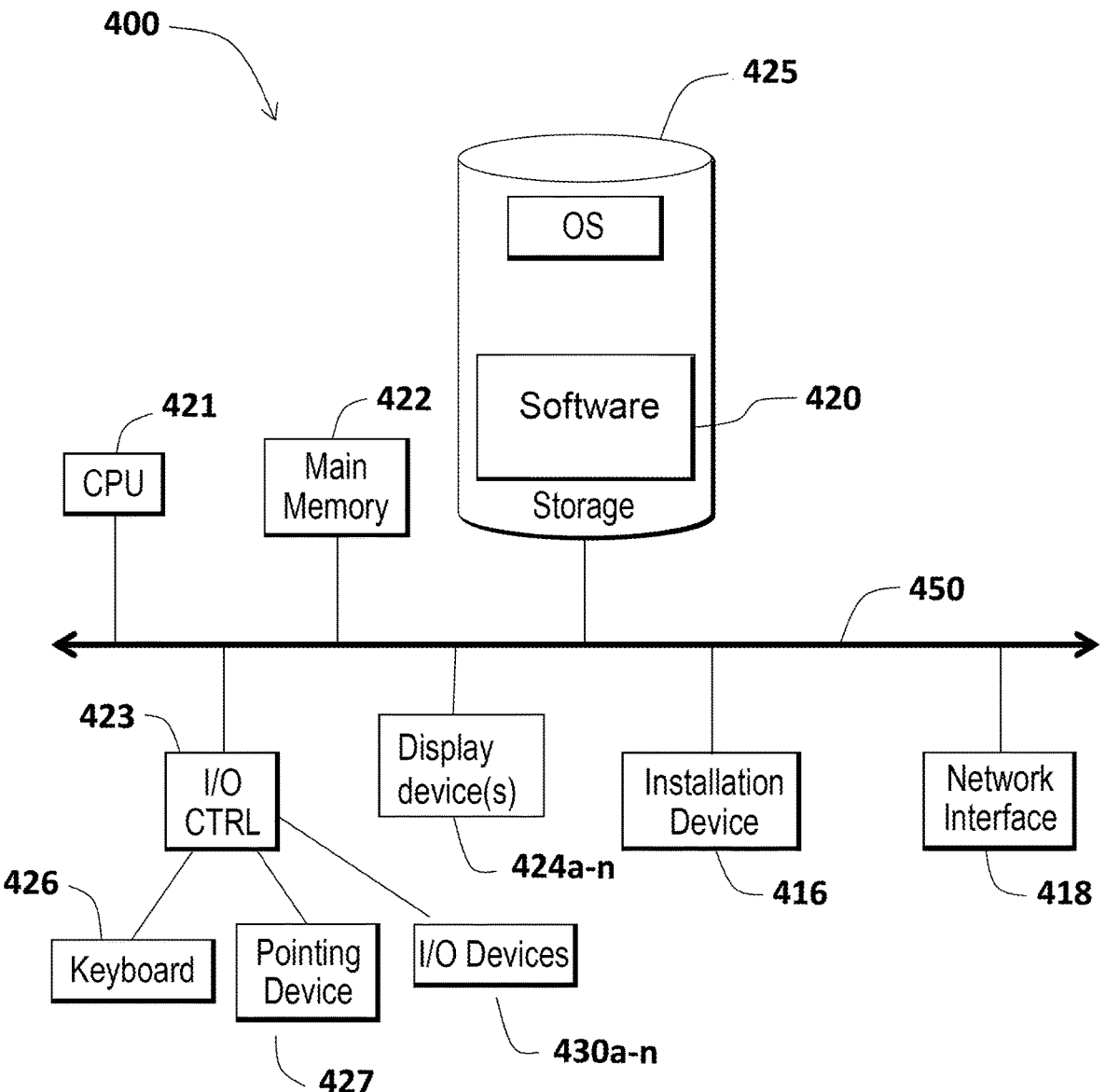
FIGS. 4B and 4C are block diagrams depicting embodiments of computing devices useful in connection with the methods and systems described herein.
Figure 4C:
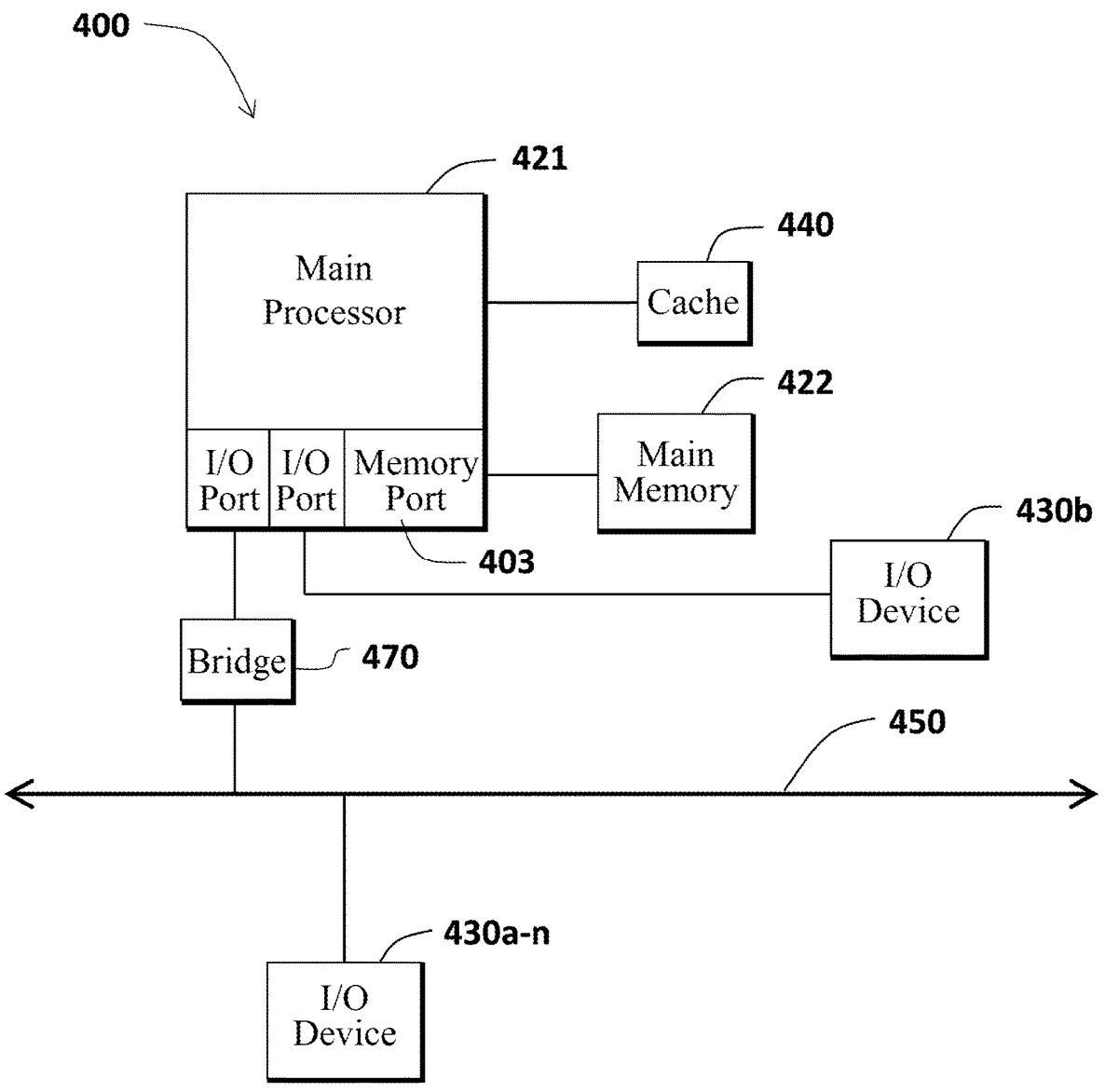

The communications device(s) 402 and access point(s) 406 may be deployed as and/or executed on any type and form of computing device, such as a computer, network device or appliance capable of communicating on any type and form of network and performing the operations described herein. FIGS. 4B and 4C depict block diagrams of a computing device 400 useful for practicing an embodiment of the wireless communication devices 402 or the access point 406. As shown in FIGS. 4B and 4C, each computing device 400 includes a central processing unit 421, and a main memory unit 422. As shown in FIG. 4B, a computing device 400 may include a storage device 428, an installation device 416, a network interface 418, an I/O controller 423, display devices 424a-424n, a keyboard 426 and a pointing device 427, such as a mouse. The storage device 428 may include, without limitation, an operating system and/or software. As shown in FIG. 4C, each computing device 400 may also include additional optional elements, such as a memory port 403, a bridge 470, one or more input/output devices 430a-430n (generally referred to using reference numeral 430), and a cache memory 440 in communication with the central processing unit 421.

The central processing unit 421 is any logic circuitry that responds to and processes instructions fetched from the main memory unit 422. In many embodiments, the central processing unit 421 is provided by a microprocessor unit, such as: those manufactured by Intel Corporation of Mountain View, California; those manufactured by International Business Machines of White Plains, New York; or those manufactured by Advanced Micro Devices of Sunnyvale, California. The computing device 400 may be based on any of these processors, or any other processor capable of operating as described herein.

Main memory unit 422 may be one or more memory chips capable of storing data and allowing any storage location to be directly accessed by the microprocessor 421, such as any type or variant of Static random access memory (SRAM), Dynamic random access memory (DRAM), Ferroelectric RAM (FRAM), NAND Flash, NOR Flash and Solid State Drives (SSD). The main memory 422 may be based on any of the above described memory chips, or any other available memory chips capable of operating as described herein. In the embodiment shown in FIG. 4B, the processor 421 communicates with main memory 422 via a system bus 450 (described in more detail below). FIG. 4C depicts an embodiment of a computing device 400 in which the processor communicates directly with main memory 422 via a memory port 403. For example, in FIG. 4C the main memory 422 may be DRDRAM.

FIG. 4C depicts an embodiment in which the main processor 421 communicates directly with cache memory 440 via a secondary bus, sometimes referred to as a backside bus. In other embodiments, the main processor 421 communicates with cache memory 440 using the system bus 450. Cache memory 440 typically has a faster response time than main memory 422 and is provided by, for example, SRAM, BSRAM, or EDRAM. In the embodiment shown in FIG. 4C, the processor 421 communicates with various I/O devices 430 via a local system bus 450. Various buses may be used to connect the central processing unit 421 to any of the I/O devices 430, for example, a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 424, the processor 421 may use an Advanced Graphics Port (AGP) to communicate with the display 424. FIG. 4C depicts an embodiment of a computer 400 in which the main processor 421 may communicate directly with I/O device 430b, for example via HYPERTRANSPORT, RAPIDIO, or INFINIBAND communications technology. FIG. 4C also depicts an embodiment in which local busses and direct communication are mixed: the processor 421 communicates with I/O device 430a using a local interconnect bus while communicating with I/O device 430b directly.

A wide variety of I/O devices 430a-430n may be present in the computing device 400. Input devices include keyboards, mice, trackpads, trackballs, microphones, dials, touch pads, touch screen, and drawing tablets. Output devices include video displays, speakers, inkjet printers, laser printers, projectors and dye-sublimation printers. The I/O devices may be controlled by an I/O controller 423 as shown in FIG. 4B. The I/O controller may control one or more I/O devices such as a keyboard 426 and a pointing device 427, e.g., a mouse or optical pen. Furthermore, an I/O device may also provide storage and/or an installation medium 416 for the computing device 400. In still other embodiments, the computing device 400 may provide USB connections (not shown) to receive handheld USB storage devices such as the USB Flash Drive line of devices manufactured by Twintech Industry, Inc. of Los Alamitos, California.

Referring again to FIG. 4B, the computing device 400 may support any suitable installation device 416, such as a disk drive, a CD-ROM drive, a CD-R/RW drive, a DVD-ROM drive, a flash memory drive, tape drives of various formats, USB device, hard-drive, a network interface, or any other device suitable for installing software and programs. The computing device 400 may further include a storage device, such as one or more hard disk drives or redundant arrays of independent disks, for storing an operating system and other related software, and for storing application software programs such as any program or software 420 for implementing (e.g., configured and/or designed for) the systems and methods described herein. Optionally, any of the installation devices 416 could also be used as the storage device. Additionally, the operating system and the software can be run from a bootable medium.

Furthermore, the computing device 400 may include a network interface 418 to interface to the network 404 through a variety of connections including, but not limited to, standard telephone lines, LAN or WAN links (e.g., 802.11, T1, T3, 56kb, X.25, SNA, DECNET), broadband connections (e.g., ISDN, Frame Relay, A™, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, IEEE 802.11n, IEEE 802.11ac, IEEE 802.11ad, CDMA, GSM, WiMax and direct asynchronous connections). In one embodiment, the computing device 400 communicates with other computing devices 400' via any type and/or form of gateway or tunneling protocol such as Secure Socket Layer (SSL) or Transport Layer Security (TLS). The network interface 418 may include a built-in network adapter, network interface card, PCMCIA network card, card bus network adapter, wireless network adapter, USB network adapter, modem or any other device suitable for interfacing the computing device 400 to any type of network capable of communication and performing the operations described herein.

In some embodiments, the computing device 400 may include or be connected to one or more display devices 424a-424n. As such, any of the I/O devices 430a-430n and/or the I/O controller 423 may include any type and/or form of suitable hardware, software, or combination of hardware and software to support, enable or provide for the connection and use of the display device(s) 424a-424n by the computing device 400. For example, the computing device 400 may include any type and/or form of video adapter, video card, driver, and/or library to interface, communicate, connect or otherwise use the display device(s) 424a-424n. In one embodiment, a video adapter may include multiple connectors to interface to the display device(s) 424a-424n. In other embodiments, the computing device 400 may include multiple video adapters, with each video adapter connected to the display device(s) 424a-424n. In some embodiments, any portion of the operating system of the computing device 400 may be configured for using multiple displays 424a-424n. A computing device 400 may be configured to have one or more display devices 424a-424n.

In further embodiments, an I/O device 430 may be a bridge between the system bus 450 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a FibreChannel bus, a Serial Attached small computer system interface bus, a USB connection, or a HDMI bus.

A computing device 400 of the sort depicted in FIGS. 4B and 4C may operate under the control of an operating system, which control scheduling of tasks and access to system resources. The computing device 400 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: Android, produced by Google Inc.; WINDOWS 7 and 8, produced by Microsoft Corporation of Redmond, Washington; MAC OS, produced by Apple Computer of Cupertino, California; WebOS, produced by Research In Motion (RIM); OS/2, produced by International Business Machines of Armonk, New York; and Linux, a freely-available operating system distributed by Caldera Corp. of Salt Lake City, Utah, or any type and/or form of a Unix operating system, among others.

The computer system 400 can be any workstation, telephone, desktop computer, laptop or notebook computer, server, handheld computer, mobile telephone or other portable telecommunications device, media playing device, a gaming system, mobile computing device, or any other type and/or form of computing, telecommunications or media device that is capable of communication. The computer system 400 has sufficient processor power and memory capacity to perform the operations described herein.

In some embodiments, the computing device 400 may have different processors, operating systems, and input devices consistent with the device. For example, in one embodiment, the computing device 400 is a smart phone, mobile device, tablet or personal digital assistant. In still other embodiments, the computing device 400 is an Android-based mobile device, an iPhone smart phone manufactured by Apple Computer of Cupertino, California, or a Blackberry or WebOS-based handheld device or smart phone, such as the devices manufactured by Research In Motion Limited. Moreover, the computing device 400 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

Although the disclosure may reference one or more "users", such "users" may refer to user-associated devices or stations (STAs), for example, consistent with the terms "user" and "multi-user" typically used in the context of a multi-user multiple-input and multiple-output (MU-MIMO) environment.

Although examples of communications systems described above may include devices and APs operating according to an 802.11 standard, it should be understood that embodiments of the systems and methods described can operate according to other standards and use wireless communications devices other than devices configured as devices and APs. For example, multiple-unit communication interfaces associated with cellular networks, satellite communications, vehicle communication networks, and other non-802.11 wireless networks can utilize the systems and methods described herein to achieve improved overall capacity and/or link quality without departing from the scope of the systems and methods described herein.

It should be noted that certain passages of this disclosure may reference terms such as "first" and "second" in connection with devices, mode of operation, transmit chains, antennas, etc., for purposes of identifying or differentiating one from another or from others. These terms are not intended to merely relate entities (e.g., a first device and a second device) temporally or according to a sequence, although in some cases, these entities may include such a relationship. Nor do these terms limit the number of possible entities (e.g., devices) that may operate within a system or environment.

It should be understood that the systems described above may provide multiple ones of any or each of those components and these components may be provided on either a standalone machine or, in some embodiments, on multiple machines in a distributed system. In addition, the systems and methods described above may be provided as one or more computer-readable programs or executable instructions embodied on or in one or more articles of manufacture. The article of manufacture may be a floppy disk, a hard disk, a CD-ROM, a flash memory card, a PROM, a RAM, a ROM, or a magnetic tape. In general, the computer-readable programs may be implemented in any programming language, such as LISP, PERL, C, C++, C#, PROLOG, or in any byte code language such as JAVA. The software programs or executable instructions may be stored on or in one or more articles of manufacture as object code.

While the foregoing written description of the methods and systems enables one of ordinary skill to make and use what is considered presently to be the best mode thereof, those of ordinary skill will understand and appreciate the existence of variations, combinations, and equivalents of the specific embodiment, method, and examples herein. The present methods and systems should therefore not be limited by the above described embodiments, methods, and examples, but by all embodiments and methods within the scope and spirit of the disclosure.

What is claimed is:

1. A device comprising:
an interface configured to communicate over a protocol having a plurality of output levels;
a first transceiver output configured for proximal connection in series with a near-end termination circuit of a first transmission line;
a second transceiver output configured for distal connection with the near-end termination circuit;
a first select line, configured to enable the first transceiver output; and a second select line, configured to enable the second transceiver output, wherein:
in a first mode of operation:
the first transceiver output is enabled;
the second transceiver output is disabled; and
the interface communicates at a first output level of the plurality of output levels, and
in a second mode of operation:
the second transceiver output is enabled; the first transceiver output is disabled; and
the interface communicates at a second output level of the plurality of output levels.

2. The device of claim 1, wherein:
the first transceiver output and the second transceiver output are selectable outputs from a same transceiver;
the transceiver comprises:
first and second positive output terminals; and
first and second negative output terminals;
the first and second positive output terminals are intermediated by a first termination resistor of the near-end termination circuit; and
the first and second negative output terminals are intermediated by a second termination resistor.

3. The device of claim 1, comprising a third select line to cause the second transceiver output to enter a low impedance state.

4. The device of claim 1, wherein the interface is configured to adjust the first select line and the second select line responsive to a type of the protocol.

5. The device of claim 1, wherein the interface is configured to adjust the first select line and the second select line responsive to a symbol received for transmission.

6. The device of claim 1, wherein in a third mode of operation, the first transceiver output and the second transceiver output are enabled.

7. The device of claim 1, wherein the near-end termination circuit comprises:
first inputs configured to receive first differential signals; and
second inputs, different from the first inputs, configured to transmit second differential signals.

8. A circuit comprising:
a first select line, configured to enable a first transceiver output in series with a near-end termination circuit of a first transmission line to cause the circuit to generate output signals at a first output level of a plurality of output levels;
a second select line, configured to enable a second transceiver output configured for distal connection with the near-end termination circuit to cause the circuit to generate output signals at a second output level of the plurality of output levels; and a selection circuit to select one or more of the first select line and the second select line.

9. The circuit of claim 8, wherein the selection circuit is configured to simultaneously select the first select line and the second select line.

10. The circuit of claim 8, wherein:

the first transceiver output and the second transceiver output are selectable outputs from a same transceiver;

the transceiver comprises:

first and second positive output terminals; and
first and second negative output terminals;

the first and second positive output terminals are intermediated by a first termination resistor of the near-end termination circuit; and the first and second negative output terminals are intermediated by a second termination resistor.

11. The circuit of claim 8, comprising a third select line to cause the second transceiver output to enter a low impedance state.

12. The circuit of claim 8, wherein the circuit is configured to adjust the first select line and the second select line responsive to a selected protocol.

13. The circuit of claim 8, wherein the circuit is configured to adjust the first select line and the second select line responsive to a symbol received for transmission.

14. The circuit of claim 8, wherein in a third mode of operation, the first transceiver output and the second transceiver output are enabled.

15. The circuit of claim 8, wherein the near-end termination circuit comprises:

first inputs configured to receive first differential signals; and second inputs, different from the first inputs, configured to transmit second differential signals.

16. A system comprising:

an interface configured to communicate over a protocol having a plurality of output levels;

a first transceiver output configured for proximal connection in series with a near-end termination circuit of a first transmission line;

a second transceiver output configured for distal connection with the near-end termination circuit;

a first select line, configured to enable the first transceiver output;

a second select line, configured to enable the second transceiver output; and a third select line, configured to cause the second transceiver output to enter a low impedance state.

17. The system of claim 16, wherein:

in a first mode of operation, the first transceiver output is enabled, the second transceiver output is disabled, and the interface communicates at a first output level of the plurality of output levels, and in a second mode of operation, the second transceiver output is enabled, the first transceiver output is disabled, and the interface communicates at a second output level of the plurality of output levels.

18. The system of claim 17, wherein in a third mode of operation, the first transceiver output and the second transceiver output are enabled.

19. The system of claim 16, wherein:

the first transceiver output and the second transceiver output are selectable outputs from a same transceiver;

the transceiver comprises:

first and second positive output terminals; and
first and second negative output terminals;

the first and second positive output terminals are intermediated by a first termination resistor of the near-end termination circuit; and the first and second negative output terminals are intermediated by a second termination resistor.

20. The system of claim 16, wherein the interface is configured to adjust the first select line and the second select line responsive to a type of the protocol or responsive to a symbol received for transmission.

* * * * *